United States Patent
Schierling et al.

(10) Patent No.: US 6,760,239 B2
(45) Date of Patent: Jul. 6, 2004

(54) METHOD FOR CONTROLLING A MATRIX CONVERTER

(75) Inventors: Hubert Schierling, Erlangen (DE);
Olaf Simon, Erlangen-Frauonaurach (DE); Manfred Bruckmann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/438,609

(22) Filed: May 15, 2003

(65) Prior Publication Data

US 2003/0202369 A1 Oct. 30, 2003

Related U.S. Application Data

(63) Continuation of application No. PCT/DE01/04288, filed on Nov. 15, 2001.

(30) Foreign Application Priority Data

Nov. 22, 2000 (DE) .......................................... 100 57 783

(51) Int. Cl.$^7$ .......................................... H02M 7/5387
(52) U.S. Cl. .................... 363/132; 363/164; 363/137
(58) Field of Search ................................ 363/131, 132, 363/136, 137, 138, 8, 159, 160, 163, 164, 165

(56) References Cited

U.S. PATENT DOCUMENTS

| | | | |
|---|---|---|---|
| 4,468,725 A | 8/1984 | Venturini | |
| 4,648,022 A | 3/1987 | Schauder | |
| 4,833,588 A | 5/1989 | Schauder | |
| 5,594,636 A | 1/1997 | Schauder | |
| 5,949,672 A | 9/1999 | Bernet | |
| 6,462,974 B1 | * 10/2002 | Jadric | ......................... 363/127 |

OTHER PUBLICATIONS

Veröfftentl. "Analysis and Design of Optimum–Amplitude Nine–Switch Direct AC–AC Converters", v. Alesina u. Venturini, in IEEE, vol. 4, No. 1, Jan. 1989, pp. 101–112.
Veröffentl. "Space Vector Modulated Three–Phase to Three–Phase Matrix Converter with Input Power Factor Correction", v. L. Huber u. D. Borejevic, in IEEE, vol. 31, No. 6, Nov./Dec. 1995, p. 1234–1245.
Veröffentl. "Space Vector Modulated Matrix Converter with Minimized Number of Switchings and Feedforward Compensation of Input Voltage Unbalance", v. P. Nielsen, F. Blaabjerg, J.K. Pederson, in Proceedings of th 1996 Intern. Conference on Power Electronics, Drivers and Energy Systems for Industrial Growth, pp. 833 until 839.

* cited by examiner

Primary Examiner—Jessica Han
(74) Attorney, Agent, or Firm—Henry M. Feiereisen

(57) ABSTRACT

A method for controlling a matrix converter with nine bidirectional power switches arranged in a 3×3 switch matrix is described. Switching states of a modulation period are each calculated with associated time intervals by using a space vector modulation method. According to the invention, these calculated switching states are each divided into switching states of an output phase of the matrix converter, with time intervals assigned to the switching states, wherein the time intervals and the output-phase-related switching states are placed into one-to-one correspondence. Depending on the measured input voltages, the output-phase-related switching states with associated time intervals are combined into a pulse train of a modulation period, so that a sequential commutation always occurs to a nearest input voltage. This significantly reduces the switching losses of a matrix converter.

1 Claim, 5 Drawing Sheets

FIG 3

| Time Interval | Switching State |
|---|---|
| Tαμ = b | 121 |
| Tβμ = a | 122 |
| Tβν = e | 133 |
| Tαν = d | 131 |
| To = c | 111 |

FIG 4

| Phase 1 | Phase 2 | Phase 3 |
|---|---|---|
| 1b | 2b | 1b |
| 1a | 2a | 2a |
| 1e | 3e | 3e |
| 1d | 3d | 1d |
| 1c | 1c | 1c |

| Phase 1 | Phase 2 | Phase 3 |
|---|---|---|
| 1c | 1c | 1c |
| 1d | 3d | 1d |
| 1b | 3e | 1b |
| 1e | 2b | 3e |
| 1a | 2a | 2a |

FIG 5

| Phase 1 | Phase 2 | Phase 3 |
|---|---|---|
| 1c | 1c | 1c |
| 1b | 2b | 1b |
| 1d | 2a | 1d |
| 1a | 3d | 2a |
| 1e | 3e | 3e |

FIG 6

METHOD FOR CONTROLLING A MATRIX CONVERTER

CROSS-REFERENCES TO RELATED APPLICATIONS

This application is a continuation of prior filed copending PCT International application no. PCT/DE01/04288, filed Nov. 15, 2001, on which priority is claimed under 35 U.S.C. §120, the disclosure of which is hereby incorporated by reference.

This application claims the priority of German Patent Application, Serial No. 100 57 783.0, filed Nov. 22, 2000, pursuant to 35 U.S.C. 119(a)-(d), the disclosure of which is incorporated herein by reference.

BACKGROUND OF THE INVENTION

The present invention relates to a method for controlling a matrix converter with nine bidirectional power switches arranged in a 3×3 matrix, employing a space vector modulation process to calculate switching states in a modulation period and time intervals associated with the modulation period.

A matrix converter is a self-commutated direct converter and enables the conversion of a constant three-phase system into a system with variable voltage and frequency. Through the arrangement of the bidirectional power switches in a 3×3 switch matrix, each of the three output phases of the matrix converter can be electrically connected to any one input phase. One phase of the matrix converter includes an arrangement of three bidirectional power switches, whereby each power switch is connected to an input phase and, on one hand, and to an output phase, on the other hand. An arrangement of this type is also referred to as a 3×1 switch matrix. The matrix converter does not require an intermediate circuit. Due to its topology, the self-commutated direct converter has a recovery capability and achieves sinusoidal mains currents through a suitably designed control.

Each of the bidirectional power switches of the matrix converter has two anti-serially connected semiconductor switches. Insulated Gate Bipolar Transistors (IGBT) are preferably used as semiconductor switches, whereby each of the semiconductor switches includes an antiparallel diode. Bidirectional power switches designed in this way are preferably used in converters for low and medium power. Through the control of these semiconductor switches of the bidirectional power switches, a continuous current path is established in a direction determined by the arrangement of the semiconductor switches. In the event both semiconductor switches of a bidirectional power switch are controlled, the latter is bidirectionally activated and a current can flow in both directions. This creates a safe electrical connection between an input phase and an output phase of the matrix converter. When only one semiconductor switch of a bidirectional power switch is controlled, the latter is unidirectionally activated, creating an electrical connection between an input phase and an output phase of the matrix converter only for a preferred current direction.

Any desired time-averaged output voltage can be obtained—within certain limits—by a controlled time sequence of combinations of switch positions within a modulation period. A matrix converter includes a controller capable of computing a suitable switch combination based on information about the input voltage space vector and a desired value for the output voltage space vector.

Conventional control methods operate either according to a phase-oriented method or a vector-oriented method.

The phase-oriented control method is described in the publication "Analysis and Design of Optimum-Amplitude Nine-Switch Direct AC-AC Converters", by Alberto Alesina and Marco G. B. Venturini, IEEE Transactions on Power Electronics, Vol. 4, No. 1, January 1989, pp. 101–112. The space vector control method is described in "Space Vector Modulated Three-Phase to Three-Phase Matrix Converter with Input Power Factor Correction', by Lászó Huber and Dušan Borejević, IEEE Transactions on Industrial Applications, Vol. 31, No. 6, November/December 1995, pp. 1234–1245. The space vector modulated control method has significant disadvantages due to high switching losses. Segments are present in the output voltage and the input current which have a pulse frequency equal to the modulation frequency, with other segments having twice the pulse frequency.

The publication "Space Vector Modulated Matrix Converter with Minimized Number of Switchings and a Feedforward Compensation of Input Voltage Imbalance", by P. Nielsen, F. Blaabjerg, and J. K. Pedersen, Proceedings of the 1996 International Conference on Power Electronics, Drives and Energy Systems for Industrial Growth, pp. 833–839, discloses a method for reducing the number of commutations. With his method, four active switching states and one switching state which generates at the output of the matrix converter a voltage space vector with Zero amplitude, are calculated using a space vector modulation method. The switching states are referred to in this publication as active vectors and as Null vector. During the space vector modulation of a matrix converter, the input current vector and the output voltage vector can be located in the same sector or in neighboring sectors. Other combinations are possible in addition to the aforedescribed combinations. The pulse frequency, i.e. the voltage space vector sequence, is usually configured symmetrically, with the null vector being located in the center of the four active vectors. If the input current vector and the output voltage vector of the matrix converter are located in the same sector, then the pulse sequence results in eight commutations. Conversely, if the input current vector and the output voltage vector of the matrix converter are located in adjoining sectors, then the pulse sequence results in ten commutations, without optimization. By using the optimization proposed in the reference, a pulse sequence is generated which has also only eight commutations. The optimized pulse sequence is obtained by combining the calculated four active vectors and a null vector. The optimized pulse sequence differs from the non-optimized pulse sequence in that the time sequence of the pulses of the active vectors is reversed and a suitable Null vector is selected. The null vector is selected from the three possible null vectors in such a way that only one commutation takes place. With this optimized space vector modulation method, only eight commutations occur during each modulation period. Reducing the number of commutations per modulation period also reduces the switching losses of the matrix converter.

This control method has an additional disadvantage regarding switching losses, since the optimization of the space vector modulation method only considers the number of commutations, but not the voltages at which the commutations take place.

It would therefore be desirable and advantageous to provide an improved method for controlling a matrix converter, which obviates prior art shortcomings and further reduces switching losses in the matrix converter.

SUMMARY OF THE INVENTION

According to one aspect of the present invention, a method for controlling a matrix converter, with nine bidirectional power switches arranged in a 3×3 switch matrix, includes the steps of calculating with a space vector modulation method switching states of a modulation interval with corresponding time intervals, decomposing the calculated switching states into corresponding output-phase-related switching states of the matrix converter; associating time intervals with the output-phase-related switching states, wherein the time intervals and the output-phase-related switching states are placed into one-to-one correspondence, and—depending on the measured input voltages—combining the output-phase-related switching states with the associated time intervals to form a pulse sequence of a modulation period in such a way that a sequential commutation is always performed to a nearest input voltage.

The order in which the output-phase-related switching states are sequentially arranged depends on the input voltages. The switching losses of the matrix converter are reduced significantly by optimizing the pulse sequence based on the input voltages within a modulation period.

The output-phase-oriented re-sorting of calculated switching states of the matrix converter produces a switching state which does not occur among the initially computed switching states of a modulation period. With the switching state, each output phase of the matrix converter is connected with an input phase that is different from the input phases of the other output phases. Because of its circular trajectory, an associated output voltage space vector is referred to as a "rotating space vector." This switching states is excluded in a space vector modulation due to its small maximum output voltage. However, when using the control method of the invention, the same switching states is produced within a modulation period, without exhibiting this disadvantage.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a table with calculated switching states and associated time intervals;

FIG. 4 shows the table of FIG. 3, which is split according to output phases;

FIGS. 5 and 6 show each a table with output-phase-related switching states for different pulse sequences;

DETAILED DESCRIPTION OF PREFERRED EMBODIMENTS

Figure 1:
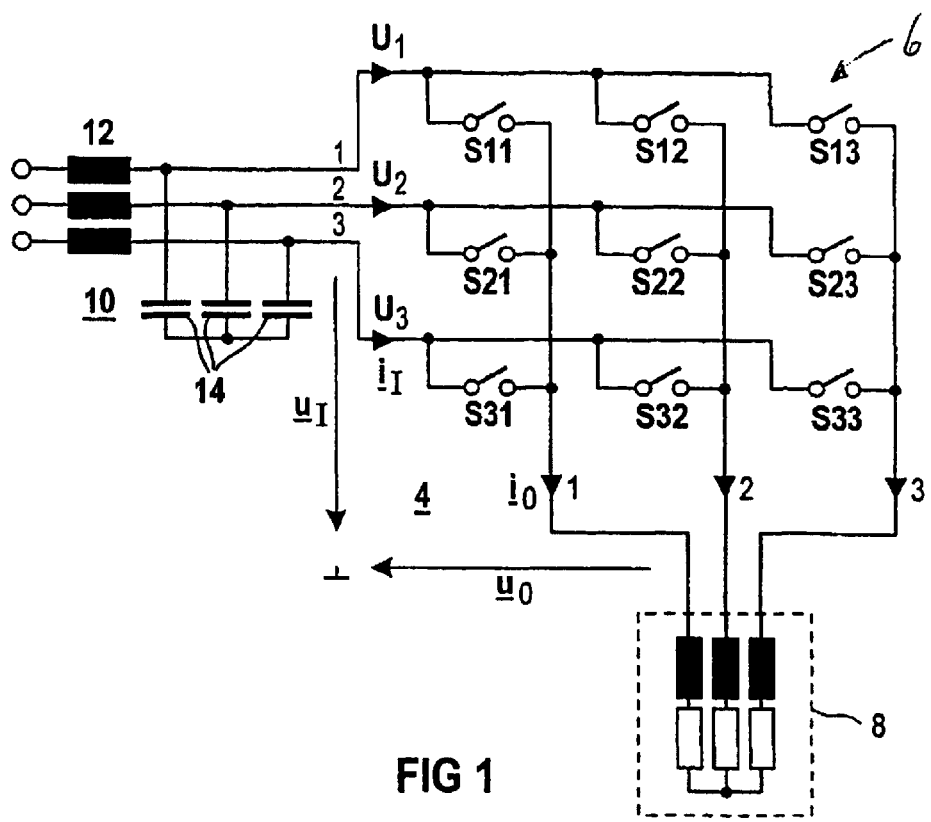
FIG. 1 shows an equivalent circuit diagram of a matrix converter.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown in detail an equivalent circuit diagram of an exemplary three-phase matrix converter 4. The three-phase matrix converter 4 has nine bidirectional power switches S11, . . . , S33, which are arranged in a 3×3 switch matrix 6. The arrangement of the nine bidirectional power switches S11, . . . , S33 in a 3×3 switch matrix 6 allows each output phase 1, 2, 3 to be switched to any desired input phase 1, 2, 3 of the matrix converter 4. An inductive load 8 is connected to the output phases 1, 2, 3 of the matrix converter 4. The input phases 1, 2, 3 are connected with an LC-filter 10, which is connected on the input side to a power line (not shown). The LC filter 10 includes inductors 12 and capacitors 14. The capacitors 14 are shown here in a star configuration, although a delta configuration is also possible. The inductors 12 are arranged in the supply lines to the capacitors 14, thereby smoothing the charge currents. Each phase of the matrix converter 4 has three bidirectional power switches S11, S21, S31; S12, S22, S32; and S13, S23, S33, respectively, which are adapted to connect the output phase 1 or 2 or 3, respectively, with the input phases 1, 2, and 3. This matrix converter phase has a ×1 switch matrix.

Figure 2:
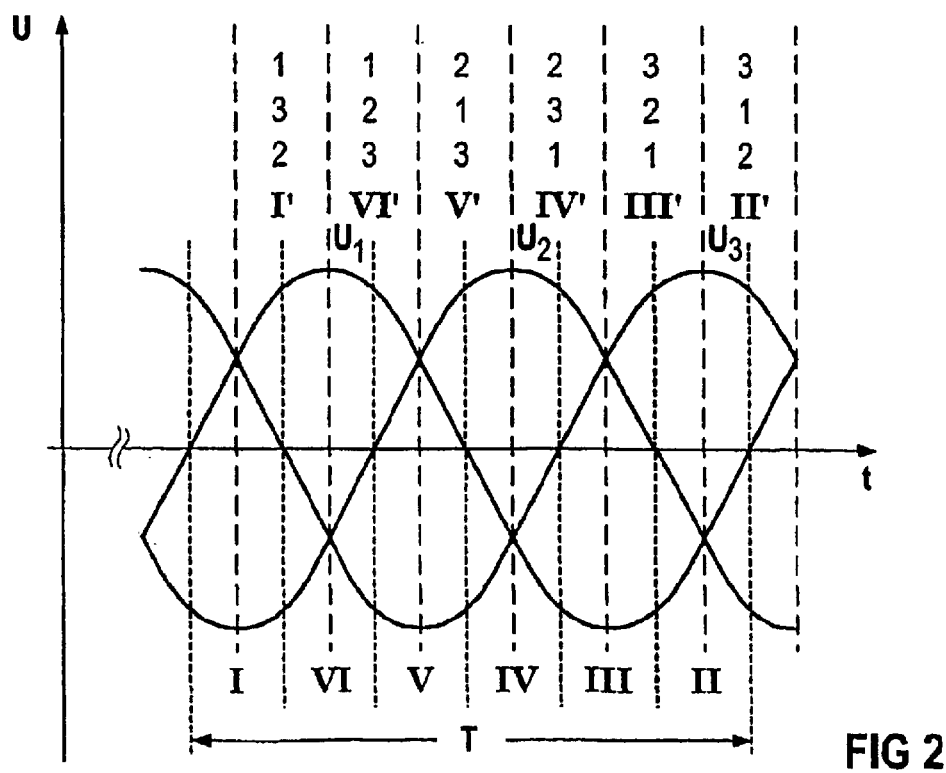
FIG. 2 shows a diagram of the input voltages of the matrix converter of FIG. 1 as a function of time over one period.

FIG. 2 shows in a diagram as a function of time t the line voltages $U_1$, $U_2$, $U_3$ applied to the inputs 1, 2 and 3 of the matrix converter 4. The line voltages $U_1$, $U_2$, $U_3$ are plotted only over one line period T. The line period T is subdivided into six sectors I, . . . , VI according to the space vector modulation. Each sector includes 60° elec., wherein the sector boundary always coincides with a zero crossing of a line voltage $U_1$, or $U_2$ or $U_3$. Also shown in this diagram are sectors I', . . . , VI' whose sector boundaries always coincide with a zero crossing of a linked line voltage. These sectors 1', . . . , VI' are shifted relative to the sectors I, . . . , VI by 30° elec. The sequence of numbers within each of the shifted sectors I', . . . , VI' indicates a commutation sequence for the matrix converter 4.

FIG. 3 shows a two-column table, with the first column showing the "Time Period" and the second column showing the "Switching State". Four active switching states 121, 122, 133 and 131 are listed in the second column for one modulation period or half a modulation period. The active switching states 121, 122, 133 and 131 generate an output voltage space vector $u_0$ that is different from zero. The switching state 111 generates an output voltage space vector $u_0$ with zero amplitude. The corresponding space vectors are referred to in the technical literature as active space vectors and null vector.

As seen from the table, the switching state of a matrix converter 4 can be described by a triad, such as 122. The first digit indicates the input phase of the matrix converter to which the first output phase 1 is to be connected. The second digit indicates the input phase of the matrix converter to which the second output phase 2 is to be connected. And the third digit indicates input phase of the matrix converter 4 to which the third output phase 3 is to be connected. According to the switching state 122, the first output phase 1 is to be connected with the line voltage $U_1$, the second output phase 2 with the line voltage $U_2$ and the third output phase 3 of the matrix converter 4 is also to be connected with the input phase $U_2$. The time interval Tβµ=a associated with this switching state indicates the duration of this switching state. When the switching state 122 is executed, the corresponding bidirectional power switches S11, S22, S23 are closed.

The table of FIG. 3 shows a calculated example from the published reference Huber, Borejević, in particular Table III and FIG. 9 therein, which is obtained by assuming an input power factor of cosφ=1 in input voltage sector VI.

FIG. 4 shows a table which is obtained by splitting the table of FIG. 3. In other words, each triad is split into its three numbers and provided with the time interval associated with the triad. This results in output-phase-oriented switching states of the matrix converter 4.

After the switching states of a modulation period calculated with a space vector modulation method are split, the time sequence of the corresponding output-phase-oriented switching states is re-sorted (downwardly with reference to the table according to FIG. 4). Sorting is done based on the measured line voltages $U_1$, $U_2$, $U_3$ by taking into consideration that a sequential commutation takes place only to the nearest line voltage $U_2$ and/or $U_3$ and/or $U_1$. The switching states for the space vector sector VI in FIG. 3 are calculated with the aforedescribed assumption following the teachings in the publication of Huber and Borejević. According to the diagram of FIG. 2, the sectors I' and VI' having the optimized commutation sequences 132 and 123 are associated with the space vector sector VI. One pulse sequence 132 after re-sorting is depicted in FIG. 5, with the other pulse sequence 123 after re-sorting depicted in FIG. 6. Each of these two tables indicates the output-voltage space vectors produced after resorting.

A comparison of the switching states according to the table of FIG. 3 with the switching states according to the table of FIG. 5, which depicts per modulation period a 132 commutation sequence, shows that the switching states 122a and 111c of the matrix converter 4 according to FIG. 3 remain unchanged. Assuming that that time interval e is greater than the time interval b, the switching state 123b appears in the optimized commutation sequence of FIG. 5, which is absent in the commutation sequence of FIG. 3. Such switching state causes each output phase of the matrix converter 4 to be connected with a different input phase of the matrix converter 4. The voltage space vector, which is generated by this switching state, is referred to as a so-called "rotating space vector." A comparison of the commutation sequences according to FIG. 3 with those of FIG. 5 under these assumptions shows that the time interval e of the switching state 133 is shortened by the time interval b, whereas the time interval d of the switching state 131 is lengthened by the time interval e.

If one assumes that the time interval b is longer than the time interval e, then the switching state 123e is present in the optimized commutation sequence of FIG. 5, which is absent in the commutation sequence of FIG. 3. The switching state 123e is again a "rotating space vector." In addition, the time interval b of the switching state 121 of FIG. 3 is shortened by the time interval e as a result of the optimization, whereas the time interval d of the switching state 131 of FIG. 3 is lengthened by the time interval e.

Figure 7:
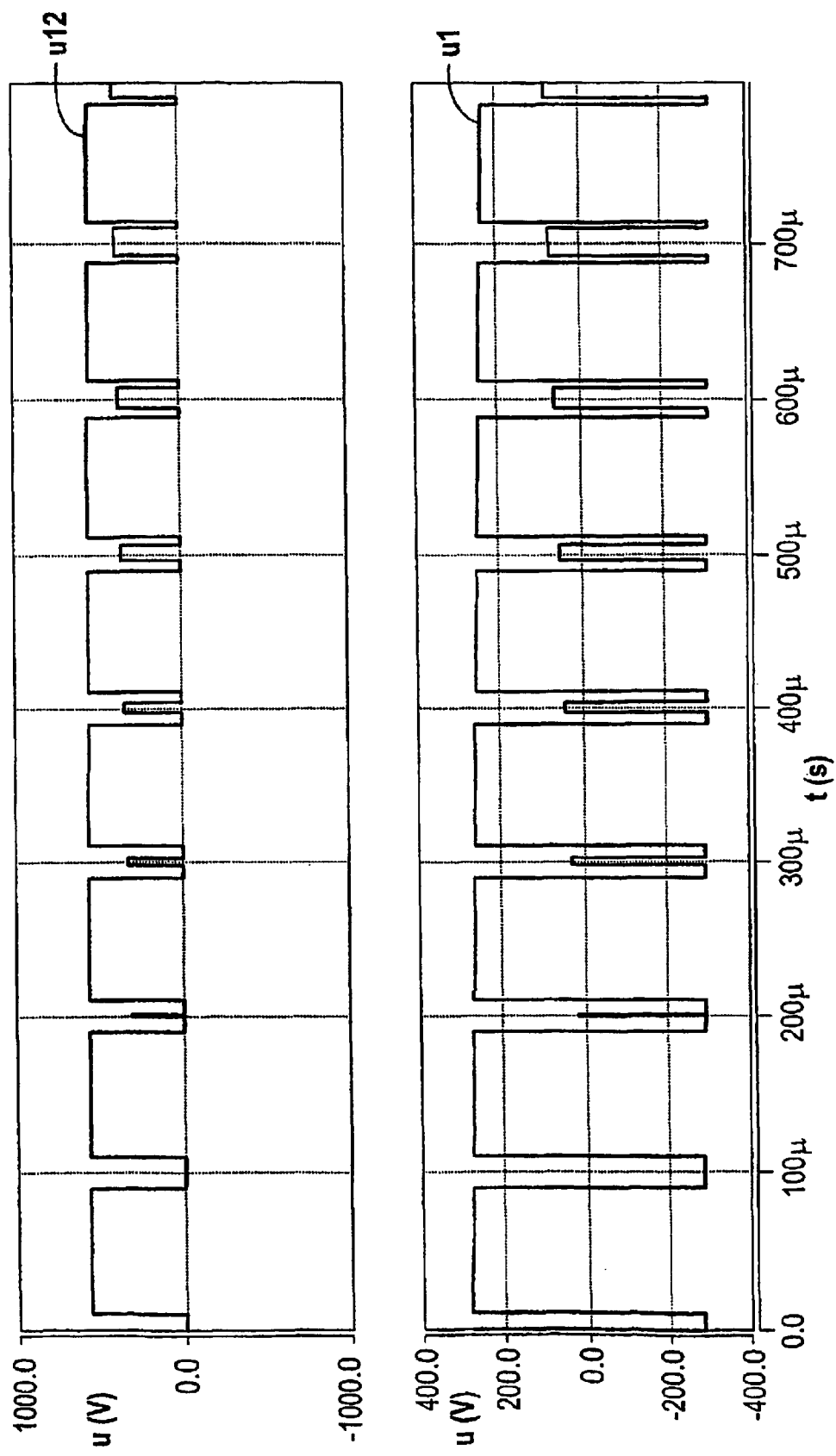
FIG. 7 shows a diagram as a function of time t of a linked output voltage and a phase output voltage for a non-optimized space vector modulation.
Figure 8:
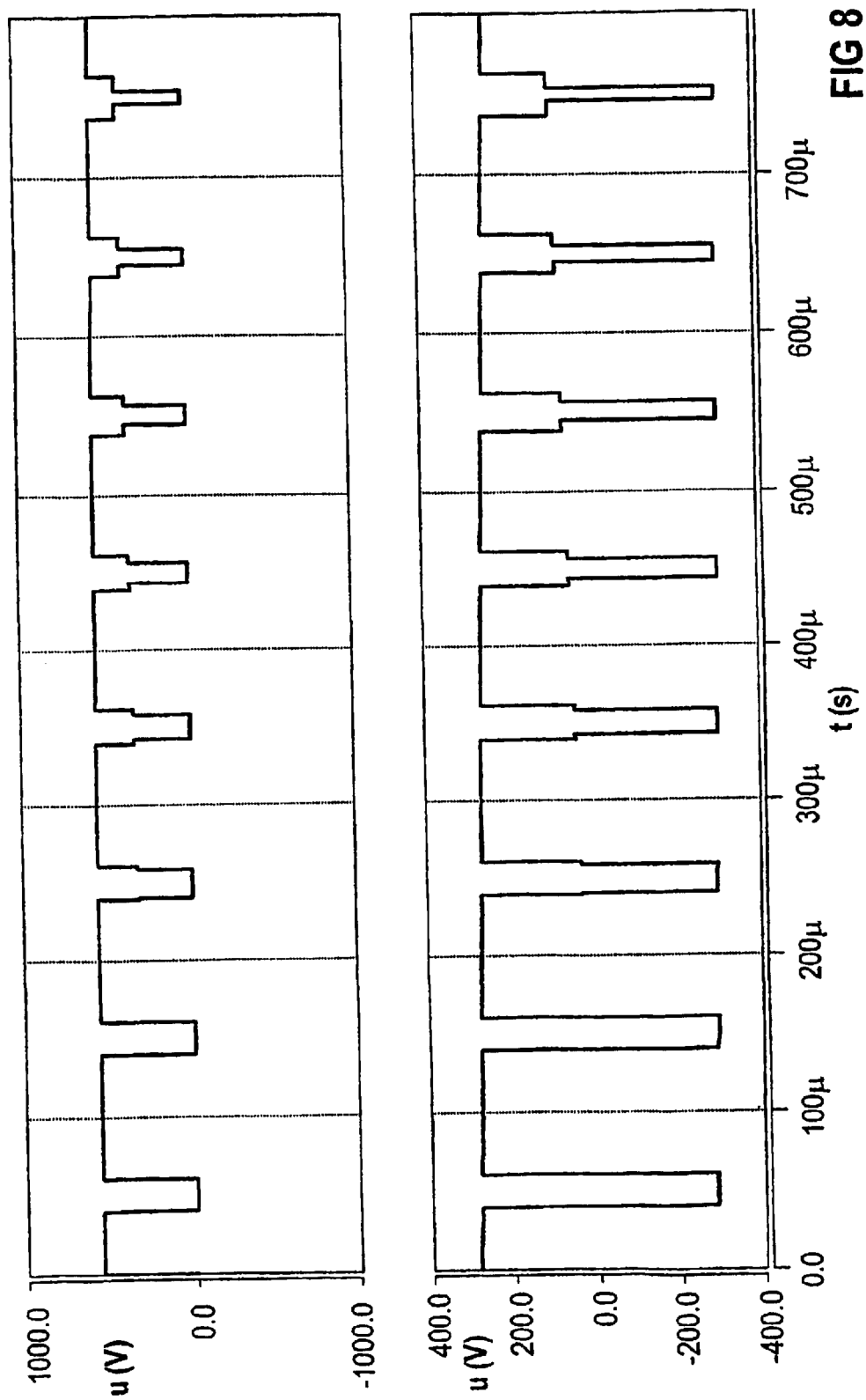
FIG. 8 shows a diagram as a function of time t of a linked output voltage and a phase output voltage for a space vector modulation according to the invention.

FIG. 7 shows in a diagram the switching characteristic of a linked output voltage $u_{12}$ and a phase output voltage $u_1$ relative to an input star point of the matrix converter 4, using the conventional space vector modulation method. In the time interval between 0 and 100 μsec, the pulse sequence is small-large-small, whereas in the time interval between 700 and 800 μsec the pulse sequence is large-small-small. The pulse sequence in the time interval between 0 and 100 μsec corresponds to a pulse frequency of approximately 10 kHz, wherein the pulse sequence in the time interval between 700 and 800 μsec corresponds to a pulse frequency of 20 kHz. This shows the basic inhomogeneity of the pulse frequency with conventional space vector modulation methods, which increases switching losses FIG. 8 shows a diagram of the switching characteristic of a linked output voltage $u_{12}$ and a phase output voltage $u_1$ relative to an input star point of the matrix converter 4, using the space vector modulation method of the invention. With the space vector modulation method of the invention, the pulse sequence in the time interval between 0 and 100 μsec is identical to the pulse sequence in the time interval between 700 and 800 μsec. Accordingly, the pulse frequency and modulation frequency are identical (in this case: 10 kHz).

The space vector modulation method of the invention for the matrix converter 4 can advantageously reduce the switching losses of the matrix converter 4 within a modulation period not only by minimizing the number of commutations, but also by taking into account the effect of the commutation voltage. To minimize the switching losses of the matrix converter 4, both optimization methods can be used with space vector modulation.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters appended claims and their equivalents:

What is claimed is:

1. A method for controlling a matrix converter with nine bidirectional power switches arranged in a 3×3 switch matrix, comprising the step of:

calculating through space vector modulation switching states of a modulation interval with corresponding time intervals;

decomposing the calculated switching states into corresponding output-phase-related switching states of the matrix converter;

associating time intervals with the output-phase-related switching states, wherein the time intervals and the output-phase-related switching states are placed into one-to-one correspondence; and combining the output-phase-related switching states with the associated time intervals in dependence on the measured input voltages to form a pulse sequence of a modulation period so that a sequential commutation is performed at any time to a nearest input voltage.

* * * * *